(12) United States Patent
Sawut et al.

(10) Patent No.: US 7,761,218 B2
(45) Date of Patent: Jul. 20, 2010

(54) AIR-FUEL RATIO CONTROL METHOD OF ENGINE AND AIR-FUEL RATIO CONTROL APPARATUS FOR SAME

(75) Inventors: Umerujan Sawut, Kanagawa-ken (JP); Buso Takigawa, Kanagawa-ken (JP); Tohti Gheyret, Kanagawa-ken (JP)

(73) Assignee: Nikki Co., Ltd., Kanagawa (JP)

( * ) Notice: Subject to any disclaimer, the term of this patent is extended or adjusted under 35 U.S.C. 154(b) by 0 days.

(21) Appl. No.: 12/289,363

(22) Filed: Oct. 27, 2008

(65) Prior Publication Data
US 2009/0138177 A1    May 28, 2009

(30) Foreign Application Priority Data
Nov. 12, 2007    (JP) ............................. 2007-292706

(51) Int. Cl.
  *B60T 7/12*    (2006.01)
  *F02M 1/00*    (2006.01)
(52) U.S. Cl. .................. 701/103; 701/115; 123/434
(58) Field of Classification Search ................ 701/101, 701/103, 104, 105, 110, 114, 115; 123/434, 123/435, 436, 674, 683, 684
See application file for complete search history.

(56) References Cited

U.S. PATENT DOCUMENTS

| | | | | |
|---|---|---|---|---|
| 4,643,151 A | * | 2/1987 | Yamauchi et al. | 123/432 |
| 5,099,817 A | * | 3/1992 | Nakaniwa | 123/674 |
| 5,181,496 A | * | 1/1993 | Kojima | 123/493 |
| 5,520,160 A | * | 5/1996 | Aota et al. | 123/675 |

FOREIGN PATENT DOCUMENTS

| JP | 57-70934 | 5/1982 |
|---|---|---|
| JP | 2005-140063 | 6/2005 |

\* cited by examiner

*Primary Examiner*—John T Kwon
(74) *Attorney, Agent, or Firm*—Rader, Fishman & Grauer PLLC

(57) ABSTRACT

An engine revolution number is controlled by operating opening and closing of a throttle valve by an engine revolution number control means on the basis of a deviation between a detected engine revolution number and a target engine revolution number, and air-fuel ratio control means applies the engine revolution number and the intake air flow rate to a predetermined numerical formula which is derived from a plurality of sets of data groups including the intake air flow rate and air-fuel ratio, which are obtained from a predetermined experiment model, and expresses the relationship between each data, to thereby calculate a fuel injection time for realizing a target air fuel ratio. A target air fuel ratio is thus realized while minimizing any delay of a response even during a transient operation, and thus, good engine operability is always acquired.

9 Claims, 5 Drawing Sheets

AIR-FUEL RATIO CONTROL METHOD OF ENGINE AND AIR-FUEL RATIO CONTROL APPARATUS FOR SAME

BACKGROUND OF THE INVENTION

1. Field of the Invention

The invention relates to an air-fuel-ratio control method of an engine and an air-fuel ratio control apparatus for carrying out the same and in particular, relates to an air-fuel ratio control method of an engine in which fuel injection time for realizing a target air fuel ratio is calculated to output a driving signal to an injector, without using data on intake air flow rate, and an air-fuel ratio control system for executing the same method.

2. Description of the Related Art

In the air-fuel ratio control of an engine, intake air flow rate ($Q_\alpha$ [kg/h]) is important data for determining basic fuel injection quantity. For example, as shown in Japanese Patent Application Laid-Open No. 57-70934, an air-fuel ratio control method is known in which calculation of an intake air flow rate per one cycle from a map is carried out by using a detected engine revolution number and an intake pipe pressure value as input variables, and detecting of an air-fuel ratio (A/F) from an emission gas component of the engine is executed to perform feedback control of the fuel injection quantity (fuel injection time) to be supplied to the engine.

However, since the above-mentioned detected values have no constant correlation, and it is necessary to store in a memory by using correction quantities for parameters as a map, and many nonlinear elements exist in an engine system, it is practically difficult to obtain an exact intake air flow rate using the map in order to perform an exact air-fuel ratio control.

In order to cope with this, the inventors of the present application already proposed, in Japanese Patent Application Laid-Open No. 2005-140063, a method of estimating the intake air flow rate ($Q_\alpha$ [kg/h]) by a predetermined calculation expression on the basis of an engine revolution number (N) and an intake pipe pressure (P [kPa]), without using a map, and of determining a fuel injection time ($T_i$) on the basis of the intake air flow rate to control an air-fuel ratio. In addition to these data, such a technique is known to use the values of intake air temperature ($T_\alpha$ [° C.]) in order to estimate a more precise intake air flow rate.

Thus, by deriving a predetermined numerical formula from an experimental verification about the physical relationship between the engine revolution number and the intake pipe pressure as described above, it is possible to exactly perform an air-fuel ratio control while sequentially estimating the intake air flow rate. However, the control of the intake air flow rate or an engine revolution number at this time is typically performed by an electronic governor which controls opening and closing of a throttle valve. Here, the air-fuel ratio control is often delayed from the control by the electronic governor by the relationship the fuel injection time ($T_i$) is obtained by the negative pressure (intake pipe pressure) generated by intake air fed to the downstream of the throttle valve, and a target engine revolution number. In a multipurpose engine which requires low cost and simple construction, the air-fuel ratio control is often performed without using an air fuel ratio sensor.

Therefore, during the transient operation of the engine that the target engine revolution number changes rapidly, there is a case where the air-fuel ratio that is defined as a ratio of an intake air quantity and a fuel amount does not coincide with a target air-fuel ratio. This gives an adverse effect on the response and the emission performance with respect to such a target engine rotational speed that changes in a short time. Thus, the time that is taken to converge into the target engine rotational speed may be delayed, and a situation in which there is a difficulty in maintaining good engine operability might occur.

SUMMARY OF THE INVENTION

The invention has been made to solve the above problems, and an object thereof is to realize a target air fuel ratio while minimizing any delay of response even during a transient engine operation, and to secure excellent engine operability, in the air-fuel ratio control of an engine.

Therefore, the present invention provides an air-fuel ratio control method of an engine using an air-fuel ratio control means which uses an intake air flow rate estimated by using an intake pipe pressure value and an engine revolution number and the engine revolution number to determine a fuel injection time, and outputs a fuel-injection signal to an injector to thereby control an air-fuel ratio of a supplied fuel. In the described air-fuel ratio control method, the engine revolution number is controlled by operating opening and closing of a throttle valve by engine revolution number control means on the basis of a deviation between the engine revolution number and a target engine rotational speed, and the air-fuel ratio control means applies values of at least the engine revolution number and the intake air flow rate to a predetermined numerical formula which is derived from a plurality of sets of data groups including the intake air flow rate, fuel injection time, engine revolution number, and air-fuel ratio at that time, which are obtained from an experiment model, and expresses the relationship between each data, to thereby calculate a fuel injection time for realizing a target air fuel ratio.

Hence, the engine revolution number control means which gives an influence on the intake pipe pressure does not feedback-control the intake pipe pressure, but operates the throttle valve using a deviation between the actual engine revolution number and the target engine revolution number, and a numerical formula (a relational formula) for determining a fuel injection time from data on the intake air flow rate, a fuel injection time, an engine revolution number, and an air-fuel ratio at that time, which are experimentally obtained, so as to cover all operating conditions is derived and set, and the intake air flow rate and engine revolution number which are obtained in a predetermined sequence are applied to the numerical formula to thereby calculate the fuel injection time. Thus, it becomes easy to realize a target air fuel ratio while minimizing any delay in the response even during transient operation.

In this air-fuel ratio control method, Numerical Formula 1 for calculating the fuel injection time is as follows:

$$T_i(t) = \frac{b_1 Q_\alpha(t) 10^6}{60 b_2 N(t)(A/F) + T_{af}(t)} + T_u(t) + T_s(t)$$

(where $T_i(t)$ is a final fuel injection time, $T_{af}(t)$ is a air-fuel ratio correction quantity by a numerical formula model, $T_u(T)$ is a transient correction injection time, $T_s(t)$ is an invalid fuel injection time, $N(t)$ is the engine revolution number, $Q_\alpha(t)$ is the intake air flow rate, A/F is a target air fuel ratio, and $b_1$ and $b_2$ are constant numbers). According to this fuel injection control method, it is possible to calculate an exact fuel injection time in relatively simple sequence without requiring intake pipe pressure data, and it becomes easy to realize a target air-fuel ratio while reducing delay of response during transient operation.

In this case, Numerical Formula 2 for calculating an air-fuel ratio correction quantity used for the numerical formula is as follows:

$$T_{af}(t) = k_p e(t) + k_i \int e(t) dt$$

(where $T_{af}(t)$ is the air-fuel ratio correction quantity by a numerical formula model, e(t) is an error for a target engine revolution number, and $k_p$ and $k_i$ are air-fuel ratio control parameters, and Numerical formula 3 for calculating an error for the target engine revolution number is as follows:

$$e(t) = c_1 N(t) - c_2 - \frac{Q_\alpha}{T_i(t-1)}$$

(where e(t) is an error for the target engine revolution number, $T_i(t-1)$ is a final fuel injection time before sampling, N(t) is the engine revolution number, $Q_\alpha$ is the intake air flow rate, and $c_1$ and $c_2$ are air-fuel ratio control parameters). According to this fuel injection control method, a target air fuel ratio can be more exactly realized.

Moreover, a program for executing the air-fuel ratio control method is stored in storage means, and an output signal by engine revolution number detecting means, and an output signal by intake pipe pressure detecting means are input to generate a fuel-injection signal, and output the generated signal to the injector, thereby executing the air-fuel ratio control method according to the aforementioned air-fuel ratio control method. According to this air-fuel ratio control system, a system which makes a target air-fuel ratio realized can be constructed by disposing the air-fuel ratio control system in a fuel supply system of an engine.

Moreover, the air-fuel ratio control system also serves as engine revolution number control means which opens and closes a throttle valve by a feedback method so as to coincide with a target engine revolution number on the basis of the engine revolution number detected, thereby controlling an intake air flow rate and the engine revolution number. According to this, more stable air-fuel ratio control can be realized by allowing the engine revolution number to be simultaneously controlled.

According to the invention which determines the fuel injection time using a numerical formula model derived from a plurality of data groups obtained from experiments, it is possible to realize a target air fuel ratio while minimizing delay of response even during transient operation, and to secure excellent engine operability.

DESCRIPTION OF PREFERRED EMBODIMENTS

Hereinafter, best modes for carrying out the invention will be described with reference to the drawings.

Figure 1:
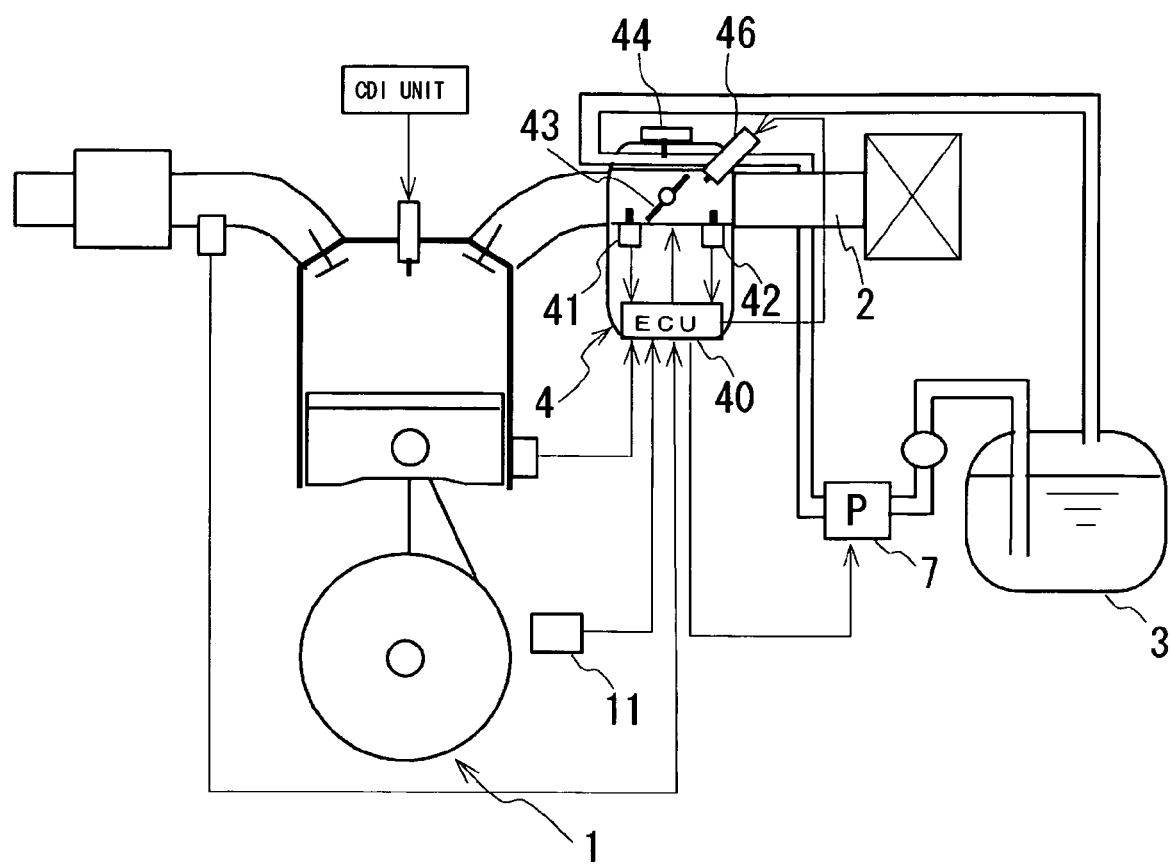
FIG. 1 is an arrangement drawing illustrating an embodiment of the invention.

FIG. 1 shows an arrangement drawing of an engine system in which an electronic control unit 40 serving as an air-fuel ratio control system which executes an air-fuel ratio control method of this embodiment is arranged. An electronic governor 4 integrally including a throttle valve 43 and an actuator (not shown) which performs opening and closing of the throttle valve, an injector 46, an intake pipe pressure sensor 41 serving as intake pipe pressure detecting means, an intake air temperature sensor 42, a pressure regulator 44, and an electronic control unit 40 are disposed in the middle of an intake pipe 2 of an engine 1.

A fuel supply pipe which extends from a fuel tank 3 and has a fuel pump 7 disposed in the middle thereof is connected to the injector 46 of the electronic governor 4. On the other hand, a crank angle sensor 11 serving as engine revolution number detecting means is disposed on the outer peripheral side of a flywheel of the engine 1 to output an engine rotation signal to the electronic control unit 40.

The electronic governor 4 constitutes engine revolution number control means which controls opening and closing of the throttle valve 43 to control an intake air flow rate and an engine revolution number, and estimates the intake air flow rate of the engine 1 by a predetermined calculating method on the basis of detected intake pipe pressure, engine revolution number, and intake air temperature, without using a flow meter, and uses the estimated intake air flow rate for control. The electronic control unit 40 also has a feature to serve as an air-fuel ratio control system for controlling the air-fuel ratio of a fuel to be supplied to the engine 1.

An air-fuel ratio control method to be executed by the electronic control unit 40 serving as the air-fuel ratio control system has a feature that fuel injection time for realizing a target air fuel ratio is calculated by applying data on at least an engine revolution number and an intake air flow rate to a numerical formula (a relational formula) which is derived from a plurality of sets of data groups including an intake air flow rate, fuel injection time, an engine revolution number, and an air-fuel ratio at that time, which are obtained from an experiment model in which all engine operational conditions are supposed, and which is preset to express the relationship between each data.

That is, the numerical formula for calculating this fuel injection time is a relational expression consisting of the aforementioned numerical formulae 1, 2, and 3, and is adapted to find final fuel injection time, using an estimated engine intake air flow rate, a detected engine revolution number, other correction elements, etc.

Next, a control sequence by the air-fuel ratio control method of this embodiment will be described. In an multipurpose engine which requires low cost and simple construction, this embodiment has a feature that control is executed such that an engine revolution number becomes a target engine revolution number according to all operating conditions of the engine 1, control is executed such that an air-fuel ratio also becomes a fixed target air fuel ratio, and air fuel control is performed using an air-fuel ratio estimated on the basis of a numerical formula model.

Here, the purpose of control by the air-fuel ratio control system of this embodiment in the engine system shown in FIG. 1 is to control an engine revolution number according to the intake air flow rate and fuel injection quantity of the engine 1 such that an air-fuel ratio becomes a target air fuel ratio under all operating conditions.

When the engine 1 is started, the data which are detected by the intake pipe pressure sensor 41, the crank angle sensor 11, and the intake air temperature sensor 42 which detect intake pipe pressure, an engine revolution number, and intake air temperature, respectively, are continuously output to the electronic control unit 40.

The intake air flow rate of the engine 1 is estimated by a predetermined calculation method, using input data of intake pipe pressure, an engine revolution number, and intake air temperature, and the electronic control unit 40 calculates an optimal final fuel injection time such that an air-fuel ratio (A/F) becomes a target air fuel ratio under all operating conditions of the engine 1 by a preset model calculation expression.

At this time, intake pipe pressure data are unnecessary to the calculation sequence of the fuel injection time, and opening and closing control of the throttle valve 43 by the engine revolution number control means is performed by a feedback method such that an actual engine revolution number becomes a target engine revolution number. Therefore, the air-fuel ratio control can be executed without being delayed with respect to control of the electronic governor 4, or changes in situation. Thus, control with extremely quick response can be realized.

Further, an input signal from the crank angle sensor 11 is fed back, control calculation is performed such that an actual engine revolution number becomes a target engine revolution number is performed, and the electronic control unit 40 outputs the calculation results to control the injector 46 and the electronic governor 4. Accordingly, even if the target engine revolution number has rapidly changed like during transient operation, control can be made such that an actual engine revolution number does not have a steady-state error with respect to the target engine revolution number, and simultaneously, control can be made such that an actual air-fuel ratio becomes a target air fuel ratio.

Figure 2A:
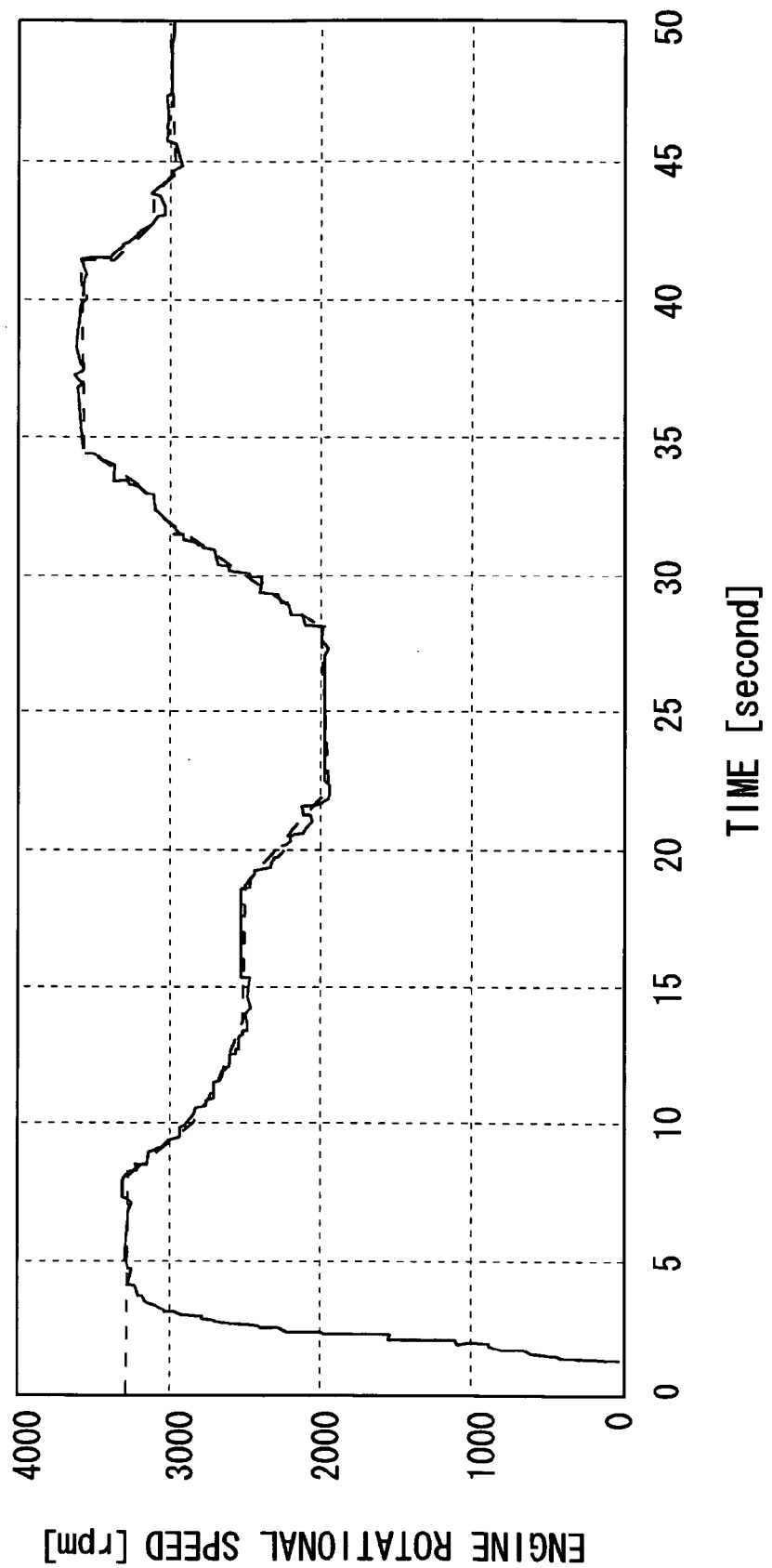
FIG. 2A is a graph illustrating control results by an air-fuel ratio control system of FIG. 1.
Figure 2B:
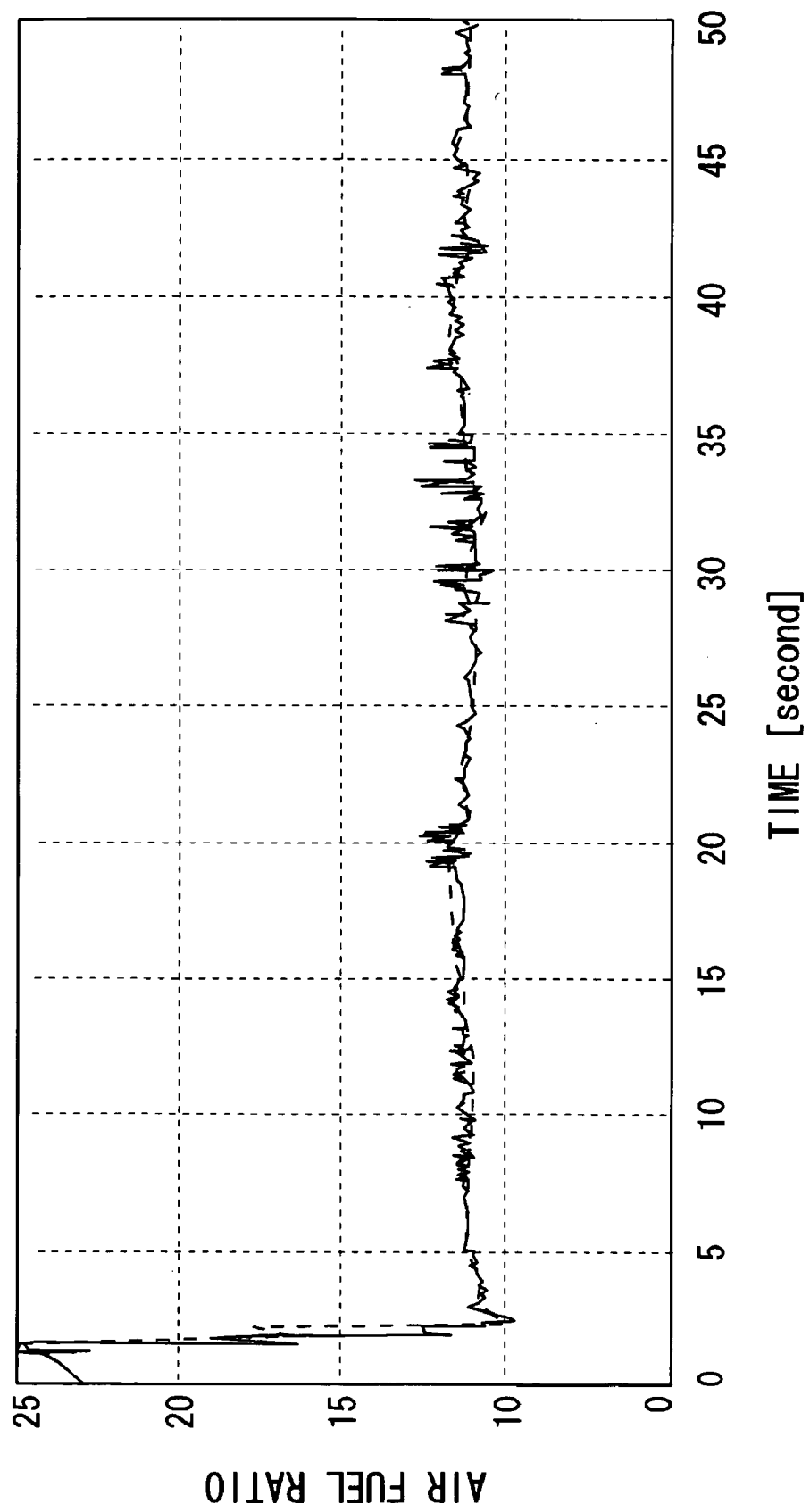
FIG. 2B is a graph illustrating control results by the air-fuel ratio control system of FIG. 1.

In the graph of FIG. 2A illustrating experimental results by the air-fuel ratio control method of this embodiment, a broken line represents a target engine revolution number and a solid line represents an actual engine rotational speed. In the graph of FIG. 2B, a solid line represents estimation values of the air-fuel ratio calculated by the aforementioned numerical formula model, and a broken line represents output values by an air fuel ratio sensor.

Figure 3A:
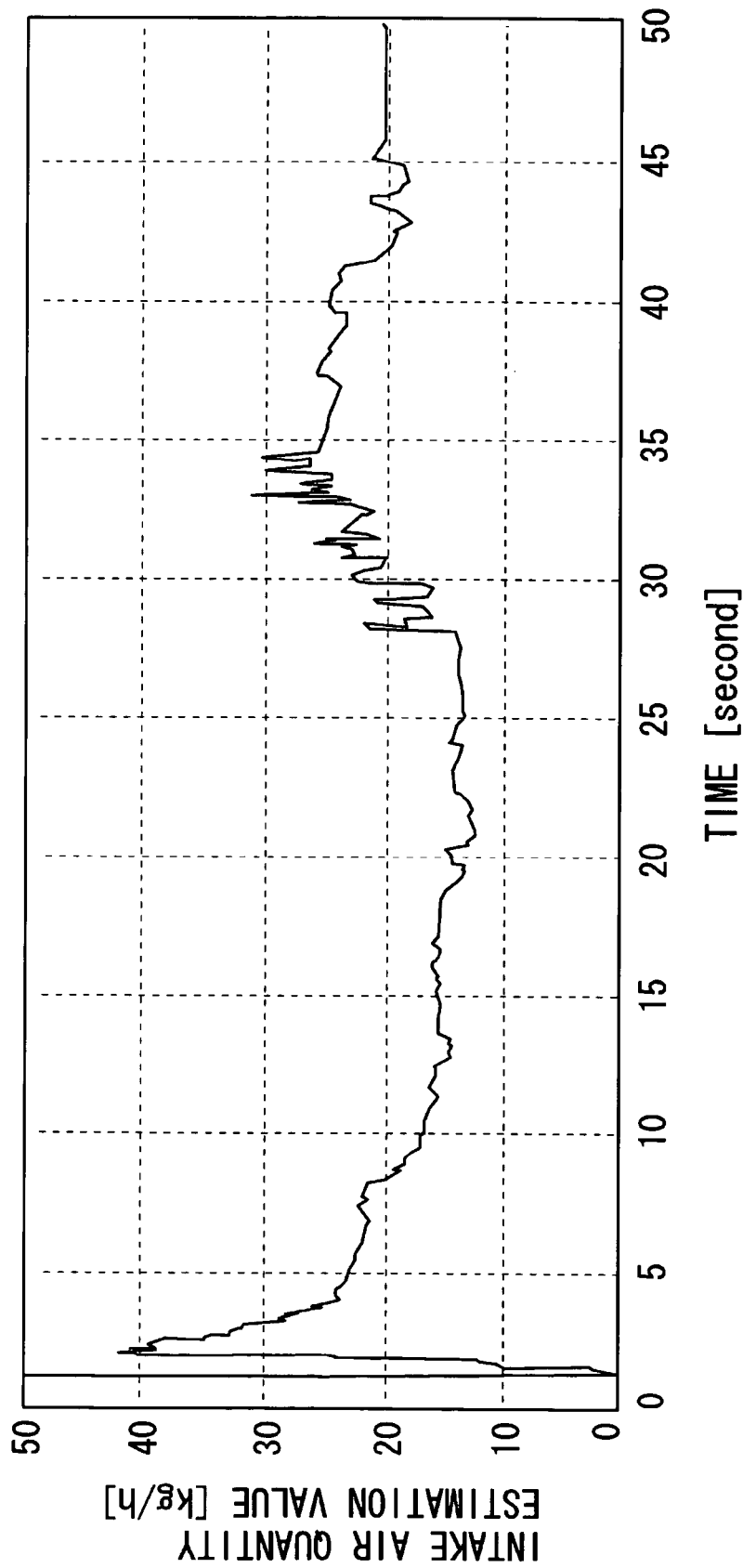
FIG. 3A is a graph illustrating control results by the air-fuel ratio control system of FIG. 1.
Figure 3B:
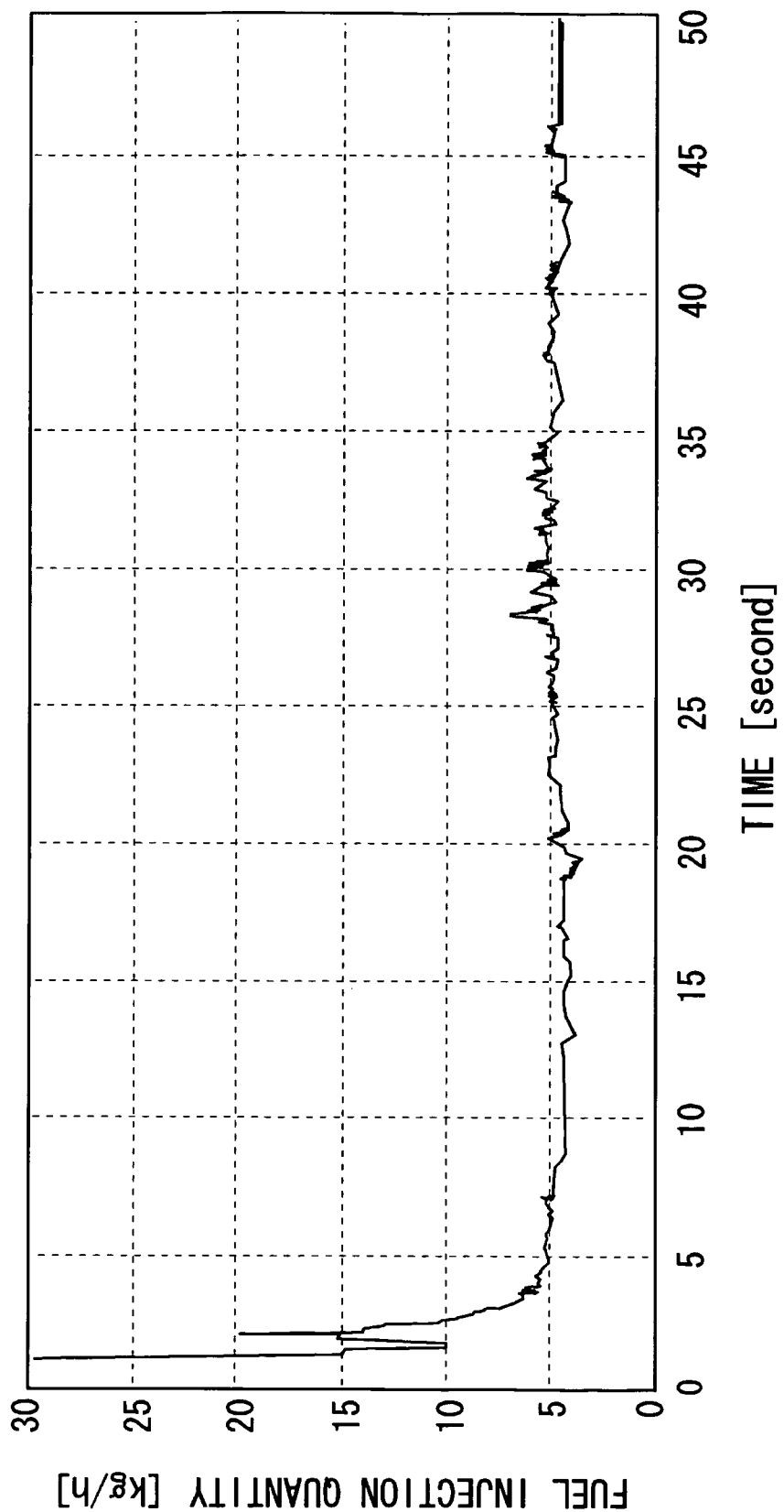
FIG. 3B is a graph illustrating control results by the air-fuel ratio control system of FIG. 1.

The graph of FIG. 3A shows estimation values of the intake air quantity according to this embodiment, and the graph of FIG. 3B shows a fuel injection quantity from the injector. It can be understood from these results that, even if an engine is in any operational condition, the air-fuel ratio and actual engine revolution number converges into a target air fuel ratio and a target engine revolution number, and the air-fuel ratio control method by this embodiment is very effective.

As described above, as for the air-fuel ratio control of an engine, according to the invention, it is possible to realize a target air fuel ratio while minimizing delay of response even during transient operation, and it is possible to secure excellent engine operability.

The invention claimed is:

1. An air-fuel ratio control method of an engine using an air-fuel ratio control means configured to use an intake air flow rate estimated using an intake pipe pressure value and an engine revolution number, and the engine revolution number, to determine a fuel injection time, and output a fuel-injection signal to an injector to thereby control an air-fuel ratio of a supplied fuel, wherein the engine revolution number is controlled by opening and closing of a throttle valve by an engine revolution number control means based on a difference between a detected engine revolution number and a target engine revolution number, and the air-fuel ratio control means applies values of at least the engine revolution number and the intake air flow rate to a fuel injection time formula which is derived from a plurality of sets of relational data groups including experimentally-obtained intake air flow rates, experimentally-obtained fuel injection times, experimentally-obtained engine revolution numbers, and experimentally-obtained air-fuel ratios to thereby calculate the fuel injection time for realizing a target air fuel ratio.

2. An fuel injection control method according to claim 1, wherein the fuel injection time formula for calculating the fuel injection time is defined as follows:

$$T_i(t) = \frac{b_1 Q_\alpha(t) 10^6}{60 b_2 N(t)(A/F) + T_{af}(t)} + T_u(t) + T_s(t)$$

(where $T_i(t)$ is a final fuel injection time, $T_{af}(t)$ is the air-fuel ratio correction quantity by a numerical formula model, $T_u(T)$ is a transient correction injection time, $T_s(t)$ is an invalid fuel injection time, $N(t)$ is the engine revolution number, $Q_\alpha(t)$ is the intake air flow rate, A/F is a target air fuel ratio, and $b_1$ and $b_2$ are constant numbers).

3. An fuel injection control method according to claim 2, wherein an air-fuel ratio correction quantity formula for calculating an air-fuel ratio correction quantity used for the fuel injection time formula is defined according to:

$$T_{af}(t) = k_p e(t) + k_i \int e(t) dt$$

(where $T_{af}(t)$ is the air-fuel ratio correction quantity by a further numerical formula model, $e(t)$ is an error for a target engine revolution number, and $k_p$ and $k_i$ are air-fuel ratio control parameters, and a target engine revolution number error formula for calculating an error for the target engine revolution number is defined as follows:

$$e(t) = c_1 N(t) - c_2 - \frac{Q_\alpha}{T_i(t-1)}$$

(where $e(t)$ is an error for the target engine revolution number, $T_i(t-1)$ is a final fuel injection time before sampling, $N(t)$ is the engine revolution number, $Q_\alpha$ is the intake air flow rate, and $c_1$ and $c_2$ are air-fuel ratio control parameters).

4. An air-fuel ratio control apparatus for executing the air-fuel ratio control method according to claim 3, wherein storage means is provided to store therein a program for executing the air-fuel ratio control method; and engine revolution number detecting means and intake pipe pressure detecting means are provided to execute inputting of an output signal, respectively, to generate a fuel-injection signal thereby outputting the generated signal to the injector.

5. An air-fuel ratio control apparatus according to claim 4, wherein the air-fuel ratio control system acts as the engine revolution number control means capable of opening and closing the throttle valve so as to coincide with target engine revolution number on the basis of the value of the engine revolution number detected, thereby controlling an intake air flow rate and the engine revolution number.

6. An air-fuel ratio control apparatus for executing the air-fuel ratio control method according to claim 2, wherein storage means is provided to store therein a program for executing the air-fuel ratio control method; and engine revolution number detecting means and intake pipe pressure detecting means are provided to execute inputting of an output signal, respectively, to generate a fuel-injection signal thereby outputting the generated signal to the injector.

7. An air-fuel ratio control apparatus according to claim 6, wherein the air-fuel ratio control system acts as the engine revolution number control means capable of opening and closing the throttle valve so as to coincide with the target engine revolution number on the basis of the value of the engine revolution number detected, thereby controlling an intake air flow rate and the engine revolution number.

8. An air-fuel ratio control apparatus for executing the air-fuel ratio control method according to claim 1, wherein storage means is provided to store therein a program for executing the air-fuel ratio control method; and
engine revolution number detecting means and intake pipe pressure detecting means are provided to execute inputting of an output signal, respectively, to generate a fuel-injection signal thereby outputting the generated signal to the injector.

9. An air-fuel ratio control apparatus according to claim 8, wherein the air-fuel ratio control system acts as the engine revolution number control means capable of opening and closing the throttle valve so as to coincide with the target engine revolution number on the basis of the value of the engine revolution number detected, thereby controlling an intake air flow rate and the engine revolution number.

* * * * *